United States Patent [19]

Meriläinen

[11] 4,239,072
[45] Dec. 16, 1980

[54] METHOD AND APPARATUS FOR EDGE-TRIMMING A BOARD

[75] Inventor: Heikki Meriläinen, Karhula, Finland

[73] Assignee: A Ahlstrom Osakeyhtio, Noormarkku, Finland

[21] Appl. No.: 937,757

[22] Filed: Aug. 29, 1978

[30] Foreign Application Priority Data

Sep. 27, 1977 [FI] Finland .................. 772835

[51] Int. Cl.³ .................. B27B 7/00; B27C 1/08
[52] U.S. Cl. .................. 144/312; 83/368; 83/371; 144/114 R; 144/130; 144/2 R; 144/323; 409/80
[58] Field of Search .................. 83/365, 368, 370, 71, 83/425.2, 425.3, 425.4, 409, 404.1; 144/114 R, 116, 117 B, 130, 218, 172, 118, 174, 176, 162 R, 326, 2 R, 3 R, 323; 90/11C, 16, 18; 409/80, 132, 188

[56] References Cited

U.S. PATENT DOCUMENTS

| | | | |
|---|---|---|---|
| 3,276,492 | 10/1966 | Kervefors | 83/368 X |
| 3,472,296 | 10/1969 | Johnson | 144/176 X |
| 3,692,074 | 9/1972 | Nilsson | 144/326 R X |
| 3,736,968 | 6/1973 | Mason | 144/3 R X |
| 4,074,601 | 2/1978 | Warren et al. | 83/368 X |
| 4,077,448 | 3/1978 | Hasenwinkle et al. | 144/130 X |
| 4,127,044 | 11/1978 | Kenyon | 144/312 X |

*Primary Examiner*—W. Donald Bray
*Attorney, Agent, or Firm*—Bucknam and Archer

[57] ABSTRACT

A method and apparatus for edge-trimming a board by means of an edger having two cutter heads adjustable in relation to each other in which the cutter heads are arranged to be movable in a direction transverse to the movement of the board while it is passing the edger. The movement of the cutter heads is controlled in such a manner that a trimmed board of optimum width is obtained.

6 Claims, 5 Drawing Figures

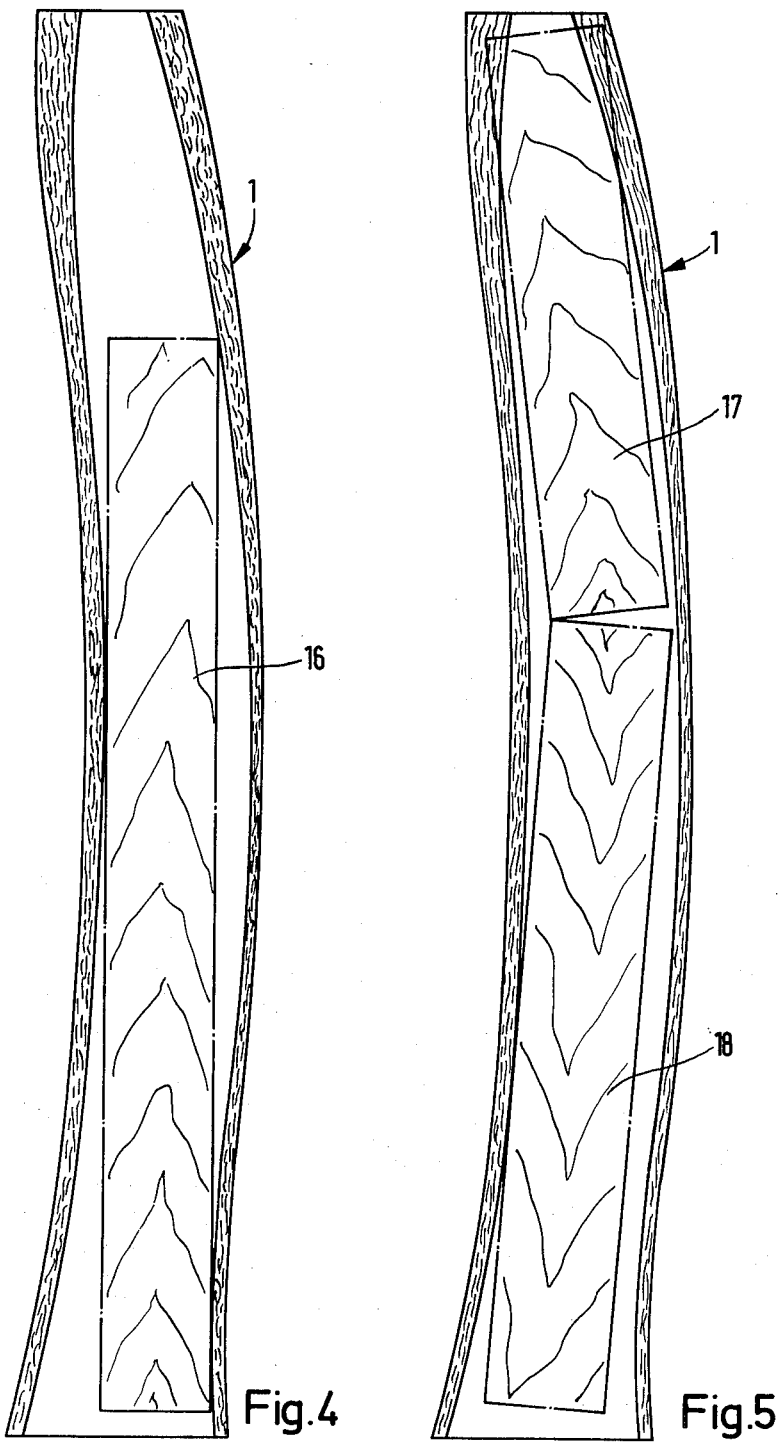

METHOD AND APPARATUS FOR EDGE-TRIMMING A BOARD

The present invention relates to a method and an apparatus for edgetrimming a board by means of two cutter heads, adjustable in relation to each other, in which method the optimum trimming direction and trimming width of the board are determined as it moves along the feeding line.

Automatic trimming tables, which perform the optimizing, usually utilize a two-location system. The measuring takes place at the side of the trimming line and the optimum position for the board is determined when it is in a measuring position or when the board is transferred to the feeding line. Defects in the position of the boards can arise when the board is oriented to its optimum position, during transfer or when the board is accelerated to the trimming speed, whereby the control device slides on the surface of the board.

When the "gate-measuring system" is applied, the board is measured as it passes the measuring gate on the trimming line. The advantages of this method, when compared to the two-location system, are simpler mechanics, a simpler measuring device and better stability of the position of the board after measuring. However, optimizing the position of the board as it moves or stopping it for optimizing results in inaccuracies and waste of time.

The object of the invention is to provide a method by means of which a board with two unfinished sides can be converted into an edge-trimmed board of optimum size without stopping it or changing its position in relation to the feeding line.

It is a characteristic feature of the method and apparatus according to the invention that the board to be edge-trimmed is made to pass from the measuring device into the edge-trimming device and through it without changing its position in relation to the feeding line. Another characteristic feature is that the cutter heads of the edger are arranged to be movable in a direction transverse to the feeding line in such a manner that the distance between them remains constant. The movement is controlled so that a board or boards defined by two longitudinal, trimmed side surfaces and the direction and width of which equal the desired optimum values is/are acquired.

When processing long curved boards it can be advantageous to convert them into two short boards of different orientation instead of one long board. This is achieved by changing the direction of the transverse movement of the cutter heads while the board is moving forward.

According to the method of the invention a computer is used which processes the measuring results, calculates the width of the optimum board and the location of its center line, in relation to the feeding line. Because the speed of the board and the distance between the edger and the measuring gate remain constant the computer is able to control the distance between the calculated center line and the feeding line by treating it as a real-time function and it can adjust the center line of the edger so that it coincides with the calculated center line during trimming. Control of the edger is initiated before the board enters it and is ended when the butt has passed it; at this point the trimming of the next board can be initiated.

The realization of the method requires a laterally movable edger. The edger can be moved eg. by means of a hydraulic cylinder and a servo valve controlled by a potentiometer. If only the cutter heads of the edger are moved the computer can control them individually.

The invention is described in more detail in the following with references to the annexed drawings of which FIG. 1 shows a top view of the apparatus for carrying out the method according to the invention;

FIG. 4 and FIG. 5 show two alternative ways of converting an unfinished curved board into edge-trimmed boards.

Figure 1:
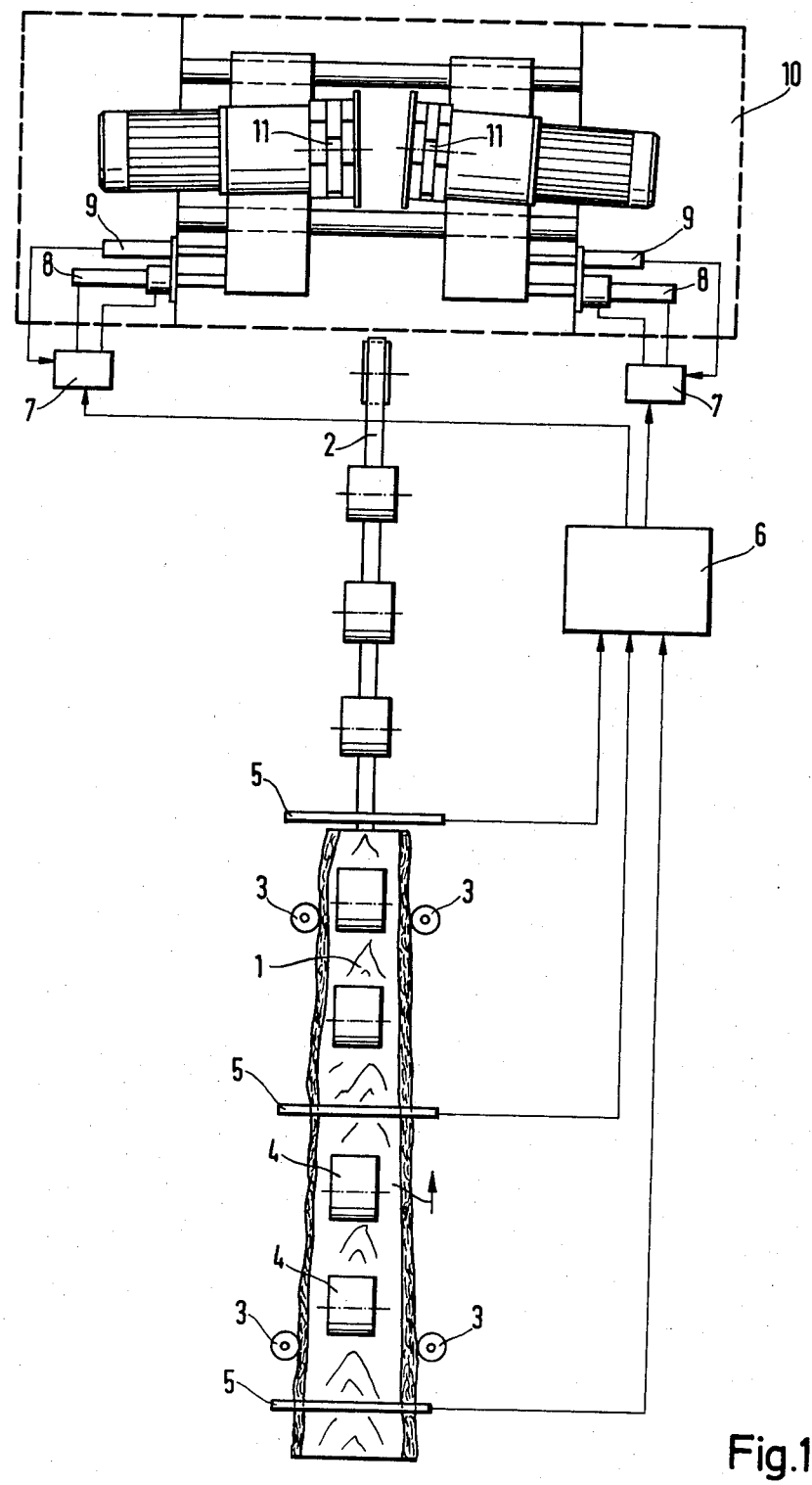
Figure 2:
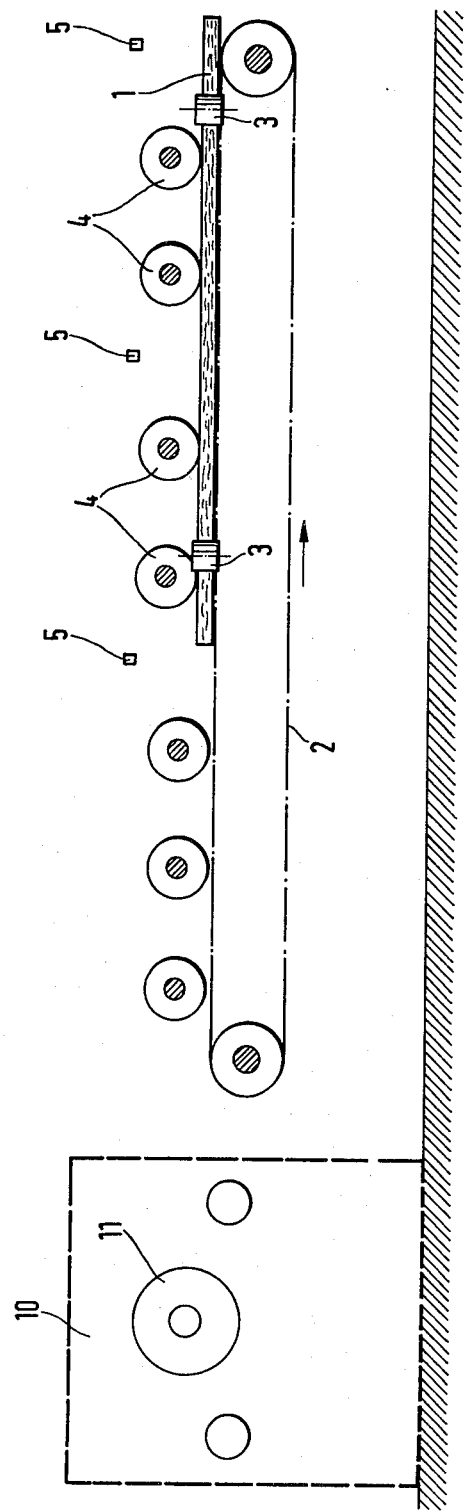
FIG. 2 shows a side view of the apparatus.

In the figures, reference number 1 shows a board to be edge-trimmed on a chain conveyer 2. The board is centered symmetrically in relation to the feeding line by means of two pairs of centering rolls 3. The centering rolls are released and the board is pressed against the chain conveyor by means of pressing rolls 4. As the board start moving, measuring is initiated at the measuring gates 5. Data acquired by measuring is stored in a computer 6. When the board has moved past the measuring gates it has been measured along its entire length and the computer calculates the width of an optimum board and the position of its center line, in relation to the feeding line. After this the computer adjusts the cutter heads 11 of the edger 10 by means of servo valves 7, hydraulic cylinders 8 and potentiometers 9, in a manner known per se, to the initial position and begins to steadily change the positioning control signals so that the edge-trimming lines coincide with the side lines of the calculated optimum board as the board passes through the edger at a steady speed.

The edger has to be situated at such a distance from the measuring gate or gates that there is enough time to process the measuring results and to set the cutter heads into their initial position. By using several measuring gates this distance decreases. The distance is about 3 meters in a three-gate system with a trimming speed of 150 m/min.

To prevent aftercut, the cutter head shafts 12 must be inclined in relation to each other in such a manner (shown in FIG. 3) that the cutter heads are closer to each other at the cutting side than at the exit side. The most preferable angle between the shafts is approximately 1°.

Figure 3:
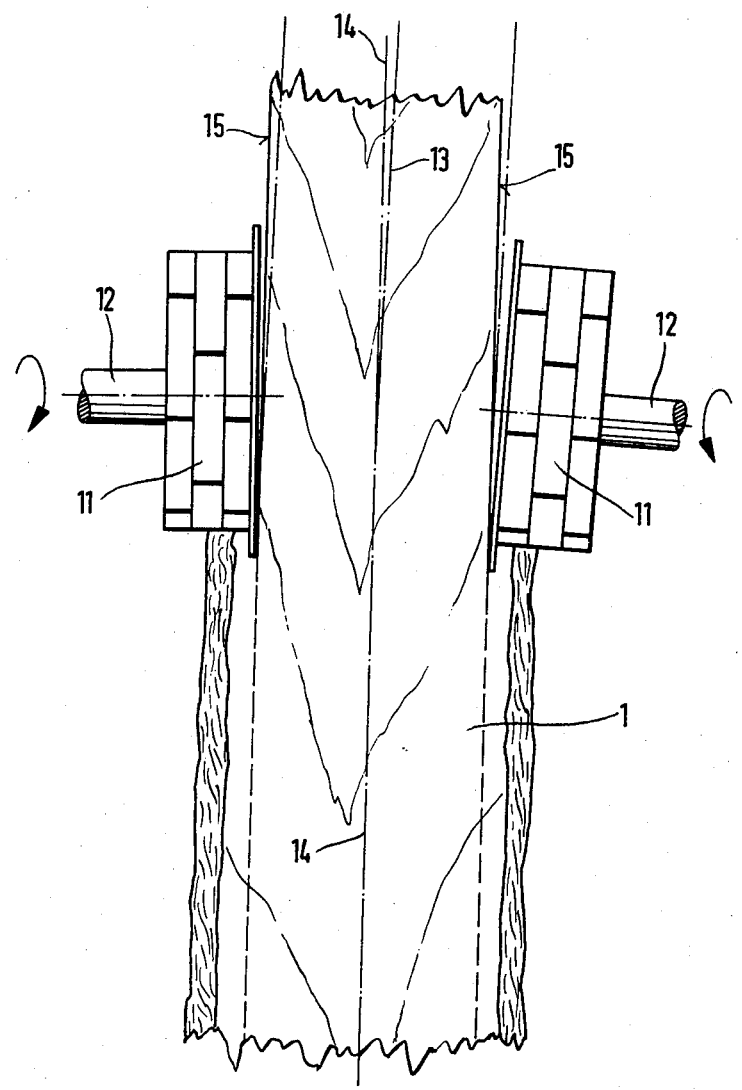
FIG. 3 illustrates the principle of edge-trimming a board with two unfinished side surfaces.

FIG. 3 shows the board 1 as it passes through the edger. Reference number 13 designates the feeding line and number 14 the centre line of the board defined by the finished side surfaces 15. Depending on the optimized result they can either form an angle as in FIG. 3 or run parallel.

FIG. 4 and 5 show a curved unfinished board 1 and two alternative ways of converting it into edge-trimmed boards. FIG. 4 shows the result when only one edge-trimmed board 16 is taken from the board. FIG. 5 shows the outcome when the direction of the transverse movement of the cutter heads is changed during trimming whereby two boards 17 and 18 are obtained from the workpiece. Depending on the quality, the value of the sawn goods obtained from the workpiece increases by 10–50%.

What we claim is:

1. The method of edge-trimming a board which has two unfinished sides, which consists of (1) centering the board symmetrically in relation to a feeding line;
(2) determining the optimum trimming direction and trimming width of the board by location of the center line of the board in relation to the feeding line by means of a measuring device;
(3) passing the board through an edge-trimming device comprising two cutter heads which are adjustable in relation to each other, without changing the position of the board in relation to the feeding line;
(4) moving the cutter heads in unison in a direction transverse to the feeding line while maintaining the distance between the cutter heads constant and
(5) controlling the motion of the cutter heads in such a manner that the board acquires two longitudinal, parallel, finished side surfaces and the width is the desired optimum value.

2. The method according to claim 1 wherein the board having two unfinished sides is curved and the direction of the transverse motion of the cutter heads in step 4) is changed while the board is moved forward whereby two short boards of different orientation are obtained.

3. An apparatus for edge trimming a board which has two unfinished sides, said apparatus comprising: means for centering said board symmetrically in relation to a feeding line, a measuring device mounted along said feeding line for determining the optimum trimming direction and trimming width of said board; an edge trimming device for trimming the sides of said board, said edge trimming device comprising two oppositely spaced adjustable cutter heads disposed on opposite sides of said feeding line; computer means for adjusting said cutter heads in relation to each other in response to said measuring devices determinations; said computer means defining means for longitudinally guiding the board in such a manner that it passes from the measuring device into the edge trimming device and through it without changing said board's position in relation to the feeding line and further defining means for transversely moving the said cutter heads in relation to the longitudinal axis of said board while maintaining said adjusted relationship between said cutter heads.

4. An apparatus according to claim 3 wherein the edge-trimming device is arranged to be movable in relation to the feeding line.

5. An apparatus according to claim 3 wherein the speed of the transversal movement of the cutter heads of the edge-trimming device is adjustable.

6. An apparatus according to claim 3 wherein the shafts of the cutter heads of the edge-trimming device are inclined in relation to each other so that they are closer to each other at the cutting side than at the exit side.

* * * * *